United States Patent [19]

Nagakura

[11] 3,997,446
[45] Dec. 14, 1976

[54] FILTER APPARATUS WITH AN ACCORDION-TYPE FILTER MEDIUM FOR COMPACTION AND REMOVAL OF SLUDGY FILTER CAKE

[76] Inventor: Masatsugu Nagakura, 719 Aza-Shimoshibaharasoe, Umena, Mishima, Shizuoka, Japan

[22] Filed: Feb. 23, 1976

[21] Appl. No.: 660,409

[52] U.S. Cl. .............................. 210/350; 210/396; 210/493 R
[51] Int. Cl.² ........................................ B01D 29/02
[58] Field of Search ............ 210/67, 106, 350, 351, 210/388, 389, 396, 397, 493 R; 55/299, 300, 304, 305, 430, 431, 475

[56] References Cited
UNITED STATES PATENTS

| | | | |
|---|---|---|---|
| 2,024,753 | 12/1935 | Zwicky | 210/106 |
| 3,252,577 | 5/1966 | Anderson | 210/396 X |
| 3,317,050 | 5/1967 | Daman | 210/388 X |
| 3,447,689 | 6/1969 | Solymar | 210/493 X |

Primary Examiner—John Adee
Attorney, Agent, or Firm—Wenderoth, Lind & Ponack

[57] ABSTRACT

A filter apparatus for slurries or the like broadly comprises a filter drum housing an accordion-type filter medium, and a cylinder actuator coaxially connected to the filter drum. The accordion filter medium includes a filter screen supported in the form of a bellows between a pair of opposed end plates slidable through the filter drum, one of the end plates being normally held at an open end of the filter drum. The cylinder actuator includes at least one piston rod projecting into the filter drum and connected to the said one end plate by slidably extending through the other end plate. A slurry enters the filter drum through its circumference, passes through the filter screen, and leaves the drum through the one end plate of the filter medium. Sludgy filter cake deposited on the filter screen is compacted and dehydrated as the end plates are moved toward each other by the cylinder actuator, and is removed from the screen as the cylinder actuator further operates to move the filter medium out of the drum.

11 Claims, 12 Drawing Figures

FILTER APPARATUS WITH AN ACCORDION-TYPE FILTER MEDIUM FOR COMPACTION AND REMOVAL OF SLUDGY FILTER CAKE

BACKGROUND OF THE INVENTION

This invention relates generally to fluid filters, and more specifically to an apparatus for removal of relatively fine solid particles from a fluid such as, typically, industrial waste slurries.

Special difficulties have attended the disposal or treatment of waste water or other liquids in industries such as plating food manufacturing or refining, chemicals producing, stonecutting, and lens grinding. Separate devices have heretofore been employed for filtration of the waste slurries and for compaction and dehydration of the filter cake. Some industrial waste liquids also require sedimentation apparatus. As a consequence, prohibitive expenses have been necessary for installation, operation and maintenance of such separate processing equipment. Large space requirements of the conventional equipment has also been a serious problem.

SUMMARY OF THE INVENTION

It is an object of this invention to provide a filter apparatus of simple, compact and unitary construction capable of fluid filtration, compaction and dehydration of filter cake, and removal of the compacted cake.

Another object of the ivention is to provide a filter apparatus including an accordion-type filter medium well calculated to permit the apparatus to perform the above indicated functions most expeditiously.

A further object is to provide a filter apparatus in which the accordion filter medium is normally compactly housed in a drum so as to provide large filtration area within a small space.

A further object is to provide a filter apparatus which permits easy automation of the complete process of filtration, filter cake compaction, and its removal.

A still further object is to provide a filter apparatus of the above described character which is perhaps best suited for use with industrial waste slurries and the like.

With all these and other objects in view this invention provides a filter apparatus consisting essentially of a filter drum containing an accordion filter medium, and a cylinder actuator connected to the drum. Typically, the filter drum is in the shape of a hollow cylinder having an open end and a closed end, and the cylinder actuator is coaxially connected to the closed end. The accordion filter medium includes a filter screen of a relatively thick fabric or the like supported in the form of a bellows between first and second opposed end plates slidably mounted in the filter drum for movement in its axial direction, the first end plate being normally located at the open end of the drum. The cylinder actuator can be the usual air cylinder having a piston rod projecting into the filter drum through its closed end and connected to the first end plate of the accordion filter medium by slidably extending through the second end plate.

A fluid to be filtered enters the filter drum through its circumference, passes through the filter screen, and leaves the drum through the first end plate. After sufficient filter cake has been deposited on the filter screen, the air cylinder may be actuated to move the first end plate toward the second within the filter drum thereby contracting the filter screen for compaction and dehydration of the cake. The compacted masses of the filter cake are easily removable as the accordion filter medium is succeedingly moved out of the open end of the filter drum with the filter screen expanded. The use of the air cylinder is advantageous in that the air under pressure for driving the same can also be utilized for removal of the compacted cake masses from the filter screen, by forcing the air into the interior of the accordion filter medium while the same is moved out of the filter drum.

In another preferred embodiment of the invention the cylinder actuator takes the form of a dual-piston air cylinder having two piston rods, one slidably fitted into the other, for connection to the respective end plates of the accordion filter medium. Advantageously, the longitudinal dimension of the dual-piston air cylinder need not be as long as that of the single-piston cylinder to cause the desired contraction and expansion of the accordion filter medium.

The features which are believed to be novel and characteristic of this invention are set forth in particular in the appended claims. The invention itself, however, both as to its organization and mode of operation, together with the further objects and advantages thereof, will become apparent in the course of the following description of preferred embodiments, which is to be read in connection with the accompanying drawings in which like reference characters refer to like parts throughout.

DESCRIPTION OF THE PREFERRED EMBOIMENTS

The invention will now be described more specifically as embodied in the filter apparatus of generally horizontal arrangement illustrated in FIGS. 1 to 5, inclusive. As will be seen from FIGS. 1 and 2 in particular, the horizontal filter apparatus comprises a filter drum 20 in the shape of a hollow cylinder housing a filter medium 21 of accordion type to be described later, and a cylinder actuator 22 which preferably takes the form of an air cylinder.

Figure 2:
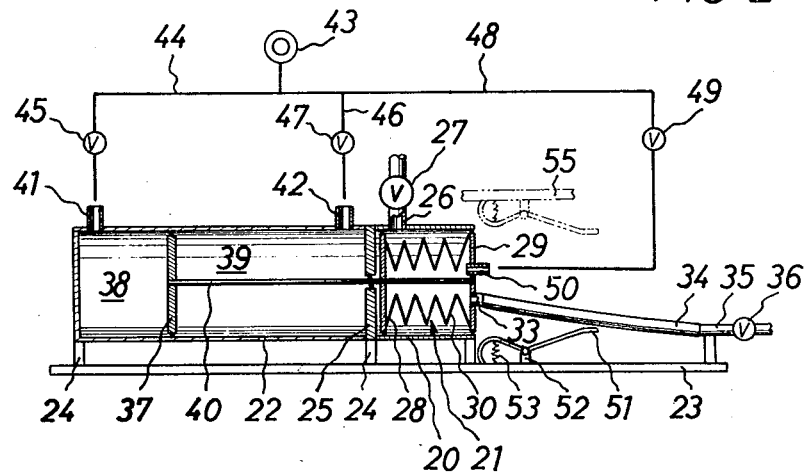
FIG. 2 is an axial sectional view of the filter apparatus of FIG. 1, in which the accordion filter medium of the apparatus is shown in its normal position within the filter drum for filtering operation.

The filter drum 20 and air cylinder 22 are shown to be equal in diameter and are rigidly connected end to end in coaxial relationship. The filter drum and air cylinder are fixedly mounted on a base 23 via three longitudinally spaced legs 24. The intermediate one of these legs 24 is integral with a disc-like wall 25 fluid-tightly closing the left-hand end, as seen in FIG. 2, of the filter drum 20, the right-hand end of the filter drum 20 being open as will be seen from FIG. 3. The wall 25 also serves to pressure-tightly close the right-hand end of the air cylinder 22. The left-hand end of the air cylinder is of course also pressure-tightly closed.

The filter drum 20 can be made of steel, and at least its internal surfaces may be treated for acid- and alkali-resistance. A fluid inlet opening 26 is formed through the circumference of the filter drum for introduction into the latter of a fluid to be filtered. A stop valve 27 is provided to the conduit leading to the fluid inlet opening 26.

Figure 5:
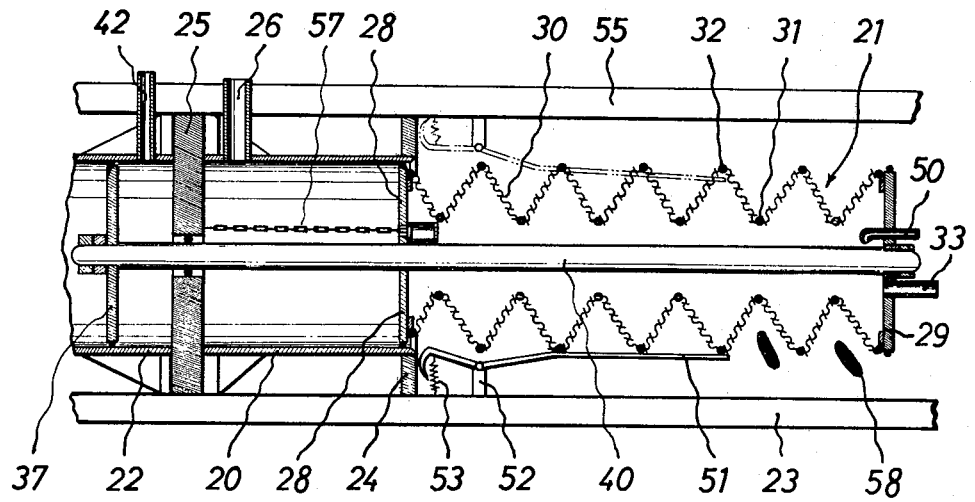
FIG. 5 is an enlarged, partial, axial sectional view showing in greater detail the filter apparatus in the condition of FIG. 4.

As illustrated in greater detail in FIG. 5 the accordion filter medium 21 includes a pair of opposed disc-like end plates 28 and 29 of rigid material slidably but fluid-tightly fitted in the filter drum 20 for movement in its longitudinal or axial direction. A filter screen 30 is supported in the form of a bellows between the end plates 28 and 29 by alternating inner and outer annular ribs 31 and 32 arranged in coaxial relationship to the filter drum 20. Typically, the filter screen 30 takes the form of a relatively thick fabric which can be made of any of a wide variety of synthetic and natural fibers depending upon the nature of the fluid to be filtered. Such fabric can be sewn or otherwise secured to the inner and outer ribs 31 and 32 as shown. The diameter of the outer ribs 32 should be slightly less than the inside diameter of the filter drum 20, and the diameter of the inner ribs 31 significantly less than that of the outer ribs.

While the inner and outer ribs 31 and 32 are shown to be in the form of separate rings, it is also possible to provide the inner and outer ribs in the form of two helices of different diameters, if such helical ribs are made of sufficiently resilient material. Thus, whether the ribs are in the form of individual rings or continuous helices, the filter screen 30 is contractable and expansible as desired with the movement of the end plates 28 and 29 toward and away from each other.

Referring again to FIG. 2 in particular, the right-hand end plate 29 of the accordion filter medium 21, which plate is normally positioned at the open right-hand end of the filter drum 20 as in the drawing, has a filtrate outlet opening 33 therethrough. The filtrate outlet opening 33 communicates via a hose 34 of suitable flexible material with a conduit 35 having a stop valve 36.

The air cylinder 22 has a reciprocating piston 37 pressure-tightly dividing the interior of the cylinder into a pair of opposed air chambers 38 and 39. A piston rod 40, rigidly connected at one end to the piston 37, extends slidably but pressure-tightly through the wall 25 and slidably through the left-hand end plate 28 of the accordion filtr medium 21 and is rigidly connected at the other end to the right-hand end plate 29 of the filter medium. The air cylinder further includes an air inlet-outlet opening 41 for ingress and egress of air under pressure into and out of the left-hand air chamber 38, and another air inlet-outlet opening 42 for ingress and egress of air under pressure into and out of the right-hand air chamber 39.

Shown at 43 is an air compressor for delivering air under pressure into the left-hand air chamber 38 of the air cylinder 22 via conduit 44, stop valve 45 and the inlet-outlet opening 41, and into the right-hand air chamber 39 via conduit 46, stop valve 47 and the inlet-outlet opening 42.

Since the air cylinder is employed as the actuator 22 in this embodiment of the invention, the air under pressure for driving the same can also be utilized for removal of filter cake from the accordion filter medium 21. To this end the air compressor 43 its further communicated with the interior of the accordion filter medium 21 via conduit 48, stop valve 49, and air inlet opening 50 formed through the right-hand end plate 29 of the filter medium.

Figure 1:
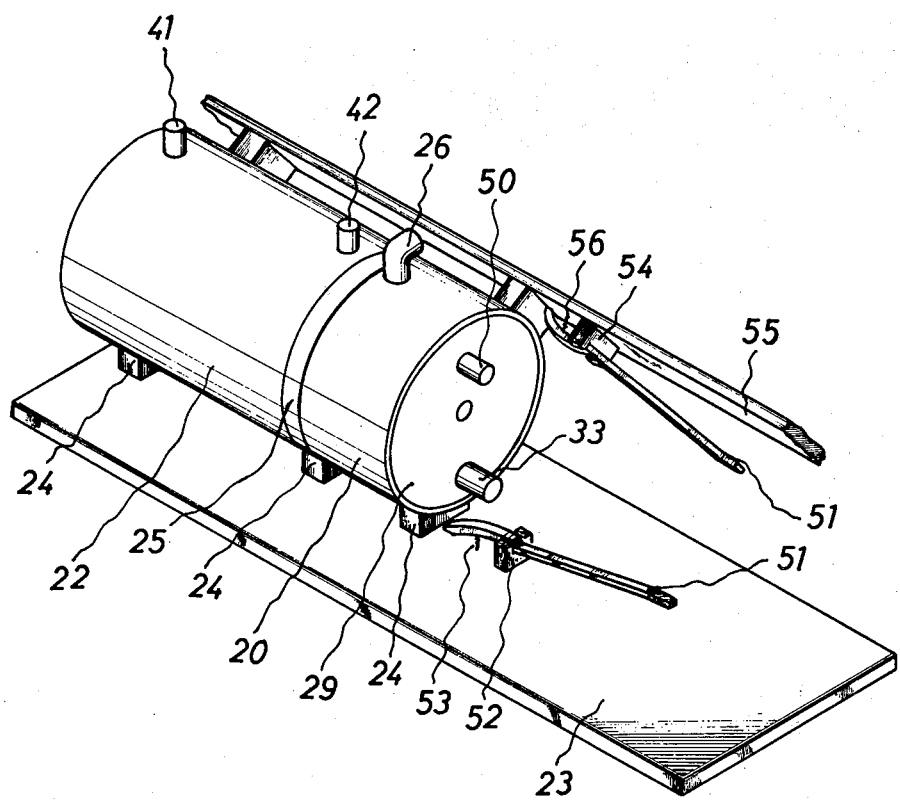
FIG. 1 is a perspective view of a filter apparatus constructed in accordance with the novel concepts of this invention.

The filter apparatus according to the invention may be further equipped with means to facilitate removal of filter cake from the accordion filter medium 21. FIGS. 1 and 5 best illustrate an example of such means, which comprises one or more, two in the illustrated embodiment, vibrator rods 51 extending along the path of travel of the accordion filter medium 21 away from within the filter drum 20. One of the two vibrator rods 51 shown in the drawings is pivotally supported on a fulcrum 52 mounted on the base 23. The proximal end of this vibrator rod is connected to a helical tension spring 53 extending from the base 23, so that the distal end of the rod projects into the path of travel of the accordion filter medium 21 for interference contact therewith. The other vibrator rod 51 is likewise pivotally supported on a fulcrum 54 mounted on an overhead frame 55, with its distal end biased into the path of travel of the accordion filter medium by a helical tension spring 56.

As illustrated in FIG. 5 the filter apparatus further comprises stop means for arresting the travel of the left-hand end plate 28 at the open right-hand end of the filter drum 20 upon movement of the accordion filter medium 21 away from within the drum. The stop means includes a chain 57 connected at both ends to the wall 25 and the left-hand end plate 28.

In operation, the accordion filter medium 21 of the horizontal filter apparatus should first be set in the position shown in FIG. 2, in which the right-hand end plate 29 of the filter medium is located at the open right-hand end of the filter drum 20. The valve 27 may now be opened to permit a fluid to be pumped or otherwise forced into the filter drum 20 via the fluid inlet opening 26. Typically, the fluid to be filtered is an industrial waste slurry containing a relativey high content of suspended solids. The fluid is filtered as it passes through the filter screen 30 of the accordion filter medium 21, and the filtrate emerging from the filter drum 20 through its filtrate outlet opening 33 is delivered to the succeeding step of processing through the hose 34, the conduit 35 and the valve 36, which valve is now assumed to be open.

After sufficient filter cake has been deposited on the filter screen 30, the valve 27 may be closed to suspend the introduction of the fluid into the filter drum 20. The air compressor 43 should then be set in operation, and the valve 47 on the conduit 46 opened, to deliver air under pressure into the right-hand air chamber 39 of the air cylinder 22 via the inlet-outlet opening 42.

Figure 3:
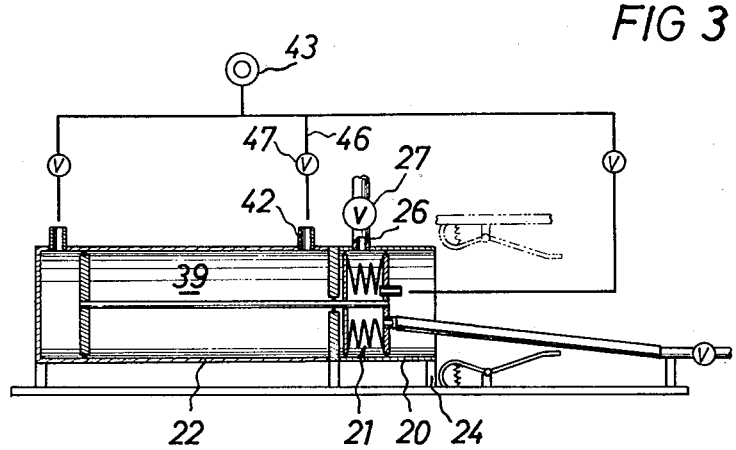
FIG. 3 is a view similar to FIG. 2 but showing the accordion filter medium contracted within the filter drum for compaction and dehydration of filter cake.

FIG. 3 shows the air cylinder piston 37 thus moved on its leftward stroke. Since the piston rod 40 is connected to the right-hand end plate 29 of the accordion filter medium 21 by slidably extending through the wall 25 and left-hand end plate 28, the right-hand end plate becomes pressed against the left-hand end plate via the contracted filter screen 30. The sludgy cake that has been deposited on the filter screen 30 is thus dehydrated and compacted into masses between the pleats of the filter screen.

Figure 4:
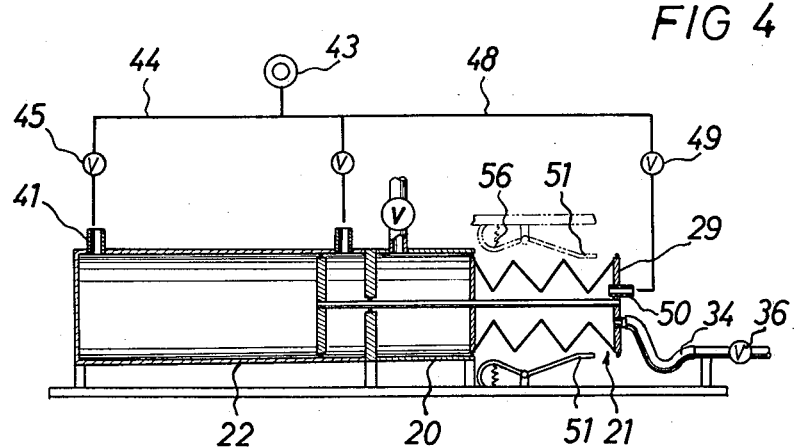
FIG. 4 is also a similar view showing the accordion filter medium moved out of the filter drum for removal of the compacted filter cake.

The valve 47 on the conduit 46 should then be closed, and the valve 45 on the conduit 44 opened instead, to deliver the air under pressure from the air compressor 43 into the left-hand air chamber 38 of the air cylinder via the inlet-outlet opening 41. The air cylinder piston 37 will then travel on its rightward stroke thereby causing the accordion filter medium 21 to project out of the filter drum 20, as illustrated in FIG. 4 and in more detail in FIG. 5. In these drawings the filter screen 30 is shown fully expanded, with the left-hand end plate 28 retained at the open end of the filter drum 20 by the stop chain 57.

Since the vibrator rods 51 are arranged for interference contact with the accordion filter medium 21 as aforesaid, the latter will vibrate during its travel away from within the filter drum 20 thereby dropping the consolidated masses of the filter cake, as indicated at 58 in FIG. 5. The removal of the cake from the filter medium will be completed if now the valve 49 on the conduit 48 is opened to permit ingress of the air under pressure from the compressor 43 into the interior of the filter medium via the air inlet opening 50. The air thus admitted into the interior of the filter medium is also effective for removal of fine solid particles clogging the meshes of the filter screen 30.

With the accordion filter medium 21 thoroughly reconditioned in the above described manner, the valve 49 may be closed, and the valve 47 opened instead, to deliver the air under pressure from the compressor 43 into the right-hand air chamber 39 of the air cylinder 22. This delivery of the air into the right-hand air chamber 39 should be continued until the right-hand end plate 29 of the filter medium becomes received into and located exactly at the open right-hand end of the filter drum 20. The air compressor 43 may then be set out of operation, and the valve 27 re-opened to resume the introduction of the fluid into the filter drum 20.

Figure 6:
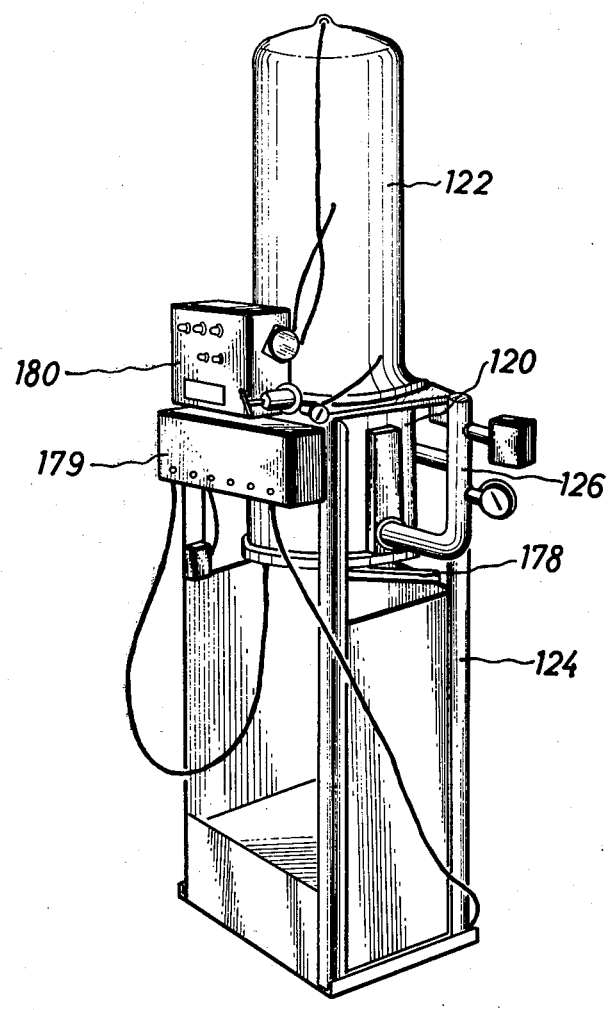
FIG. 6 is a perspective view of another preferred embodiment of the invention.

In FIGS. 6 to 12, inclusive, the invention is shown embodied in a filter apparatus of vertical type. In the succeeding description most parts of this vertical filter apparatus are identified by the same reference numerals used to identify the corresponding parts of the horizontal filter apparatus, with the digit 1 prefixed to such numerals. Thus, as best shown in FIG. 6, the vertical filter apparatus broadly comprises a filter drum 120 and cylinder actuator 122.

The filter drum 120, which can be in the shape of a hollow cylinder made of steel, glass fiber-reinforced plastic (FRP) or the like, is supported vertically in a suitably elevated position by legs 124 erected on a base 123. The bottom end of the filter drum 120 is open, whereas its top end is fluid-tightly closed by a wall 125 resting on the leg 124. The wall 125 also serves to pressure-tightly close the bottom end of the cylinder actuator 122 mounted coaxially on the filter drum 120. A fluid inlet opening 126 is formed through the circumference of the filter drum 120 for introduction into the latter of a fluid to be filtered. The conduit leading to the fluid inlet opening 126 has a stop valve 127.

As in the preceding embodiment the filter drum 120 houses an accordion filter medium 121 including a pair of opposed disc-like end plates 128 and 129 of rigid material slidably but fluid-tightly fitted in the drum for movement in its longitudinal direction. The bottom end plate 129 is normally held at the open bottom end of the filter drum 120.

Figure 10:
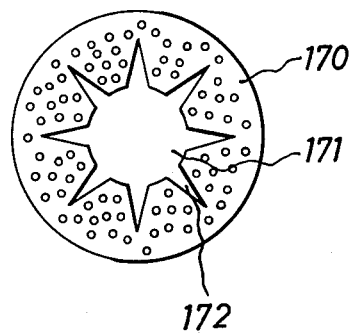
FIG. 10 is a plan view of a perforated disc, which is one of the constitutent members of support means for a filter screen in the accordion filter medium used in the filter apparatus of FIG. 6.
Figure 11:
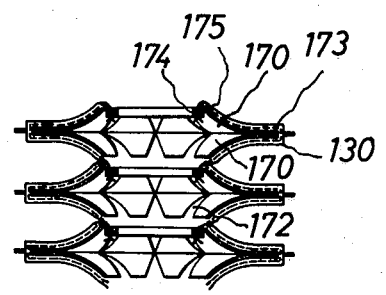
FIG. 11 is a partial, axial sectional view of the accordion filter medium in the filter apparatus of FIG. 6.

FIGS. 10 and 11 illustrate in greater detail the construction of the accordion filter medium 121. As in the first described filter medium 21 a filter screen 130 of a relatively thick fabric or the like is supported in the form of a bellows between the end plates 128 and 129. For thus supporting the filter screen 130 there is used a series of perforated discs 170 corresponding to the annular ribs 31 and 32 of the filter medium 21. These discs can be made of suitably resilient, acid-resisting material such for example as ABS (acrylonitrile-butadiene-styrene) resin or polyvinyl chloride.

As shown, each disc 170 is of dished configuration and has a relatively large, circular central aperture 171 and a plurality of notches 172 extending radially from the central aperture. Two such discs are paired, with their convexities directed away from each other, and are arranged coaxially with other similarly paired discs. Separate pieces of the filter screen 130 are tightly fitted over the respective paired discs 170. If desired, netting 173 of plastic or other material may be arranged internally of the filter screen 130, so as to directly overlie the discs 170. FIG. 11 best illustrates the manner of assemblage of the accordion filter medium 121. The bottom edges of the filter screen 130 and netting 173 covering the topmost one of the illustrated three pairs of discs 170 are tightly fitted between inner and outer rings 174 and 175 together with the top edges of the filter screen and netting covering the intermediate pair of discs. These particular rings 174 and 175 are received in the central aperture 171 of the upper one of the intermediate pair of discs. Preferably the filter screen 130 and netting 173 should be fused or otherwise integrally joined to the discs 170 at or adjacent the projecting edges of each paired discs 170. Both ends of the series of paired discs 170, supporting the filter screen 130 and netting 173 in the form of a bellows as above stated, are conveniently secured to the respective end plates 128 and 129 via discs 176 and 177, FIGS. 7 to 9, although these discs can be dispensed with.

Figure 12:
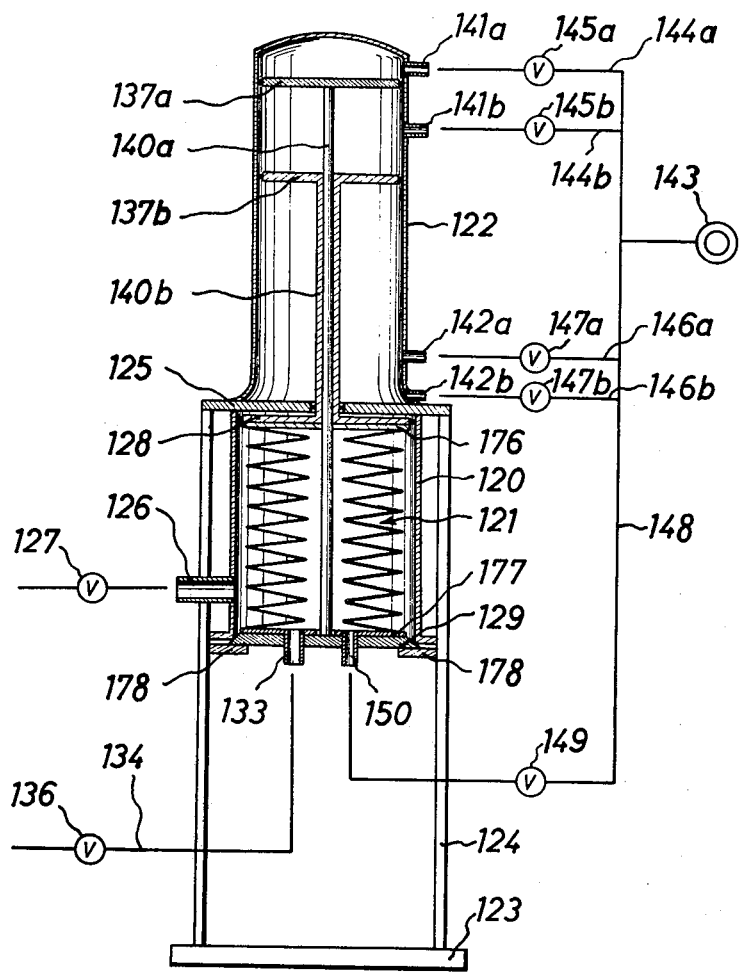
FIG. 12 is a view similar to FIG. 7 but showing the filter apparatus with various conduits and valving necessary for the operation of the apparatus.

With particular reference to FIG. 12 the bottom end plate 129 of the accordion filter medium 121 is normally held at the open bottom end of the filter drum 120 by retractable stops 178 that can be pivotally mounted on the legs 124 in any suitable manner. The bottom end plate 129 has a filtrate outlet opening 133 therethrough which communicates with a hose 134 of suitable flexible material having a stop valve 136.

The cylinder actuator 122 in this vertical filter apparatus takes the form of a dual-piston air cylinder comprising two pistons 137a and 136b having respective piston rods 140a and 140b. The rod 140b of the lower piston 137b extends slidably but pressure-tightly through the wall 125 and is secured to the top end plate 128 of the accordion filter medium 121. The rod 140a of the upper piston 137a extends slidably but pressure-tightly through the piston rod 140b and top end plate 128 and is secured to the bottom end plate 129 of the accordion filter medium. Preferably, the cylindrical casing of this air cylinder should be fashioned from transparent or semitransparent FRP or the like. Piston movement will then be smoother and visible from the outside, and the casing can be made truly circular in cross-sectional shape.

The dual-piston air cylinder 122 has four air inlet-outlet openings 141a, 141b, 142a and 142b communicating the interior of the cylinder with an air compressor 143 via respective conduits 144a, 144b, 146a, and 146b having stop valves 145a, 145b, 147a and 147b. As in the preceding embodiment the air compressor 143 further communicates with the interior of the accordion filter medium 121 via conduit 148, stop valve 149, and air inlet opening 150 formed through the bottom end plate 129 of the filter medium.

With reference directed again to FIG. 6 the filter apparatus can be equipped with a valve control console 179 for the control of the operations of the various valves shown in FIG. 12. Another control console 180 may have mounted thereon a starting switch for the air compressor 143, an alarm lamp and so forth.

Figure 7:
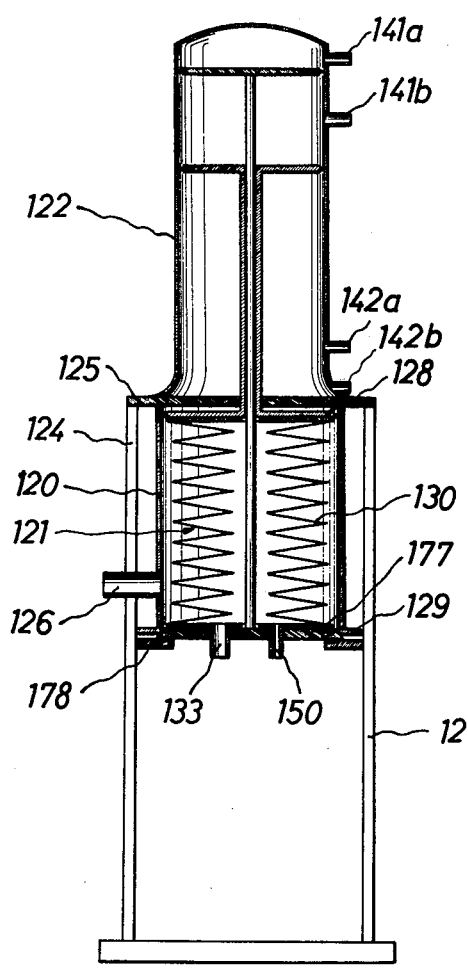
FIG. 7 is an axial sectional view of the filter apparatus of FIG. 6, in which the accordion filter medium is shown in its normal position within the filter drum for filtering opeation.

In the operation of this vertical filter apparatus the top and bottom end plates 128 and 129 of the accordion filter medium 121 should first be set in the positions shown in FIG. 7 by the respective pistons 137a and 137b of the air cylinder 122. The valve 127 may then be opened to permit a fluid to be pumped or otherwise forced into the filter drum 120 via the fluid inlet opening 126. The solids suspended in the fluid are removed as the fluid passes through the filter screen 130 of the accordion filter medium 121. The filtrate leaves the interior of the accordion filter medium through the filtrate outlet opening 133 and is delivered to the succeeding step of processing through the hose 134 and valve 136, the latter being now assumed to be open.

Upon deposition of sufficient filter cake on the filter screen 130 the valve 127 should be closed to suspend the introduction of the fluid into the filter drum 120. With the air compressor 143 then set in operation, the valve 145b on the conduit 144b may be opened to permit ingress of air under pressure into the dual-piston air cylinder 122 via the inlet-outlet opening 141b.

Figure 8:
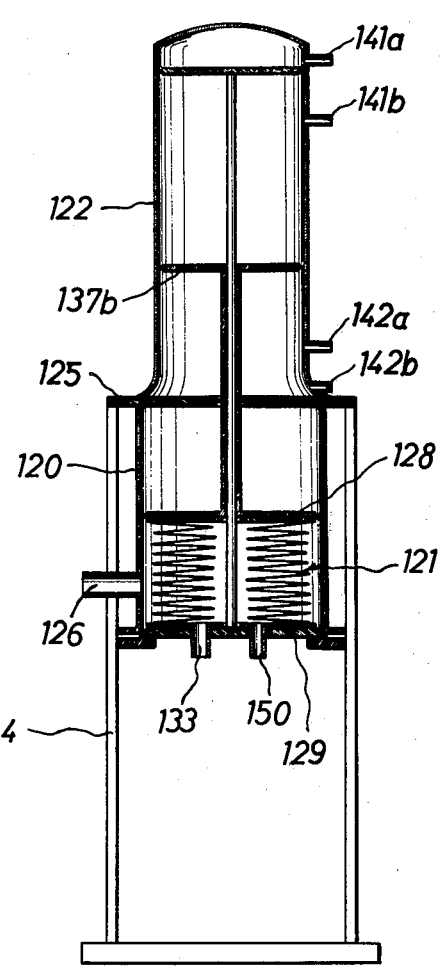
FIG. 8 is a view similar to FIG. 7 but showing the accordion filter medium contracted within the filter drum for compaction and dehydration of filter cake.

FIG. 8 shows the lower piston 137b of the air cylinder resultantly moved on its downward stroke. Since the rod 140b of this lower piston is connected to the top end plate 128 of the accordion filter medium 21 by slidably extending through the wall 125, the top end plate travels toward the bottom end plate 129 thereby causing contraction of the filter screen 130 as well as the netting 173. The sludgy cake on the filter screen 130 is thus compacted into dehydrated masses between the pleats of the filter screen.

The retractable stops 178 normally holding the bottom end plate 129 of the accordion filter medium 121 at the open bottom end of the filter drum 120 should then be pivoted out of the way, and the valve 145a on the conduit 144a opened to permit ingress of the air under pressure into the air cylinnder 122 via the inlet-outlet opening 141a. The upper piston 137a will thereupon move on its downward stroke, causing the bottom end plate 129 of the accordion filter medium to move out of the open bottom end of the filter drum 120. The lower piston 137b will then also move on its downward stroke, until the top end plate 128 of the filter medium becomes located at the open bottom end of the filter drum 120. It will therefore be appreciated that the lower piston 137b with its rod 140b serves also as the stop means for arresting the travel of the top end plate 128 at the open end of the filter drum.

Figure 9:
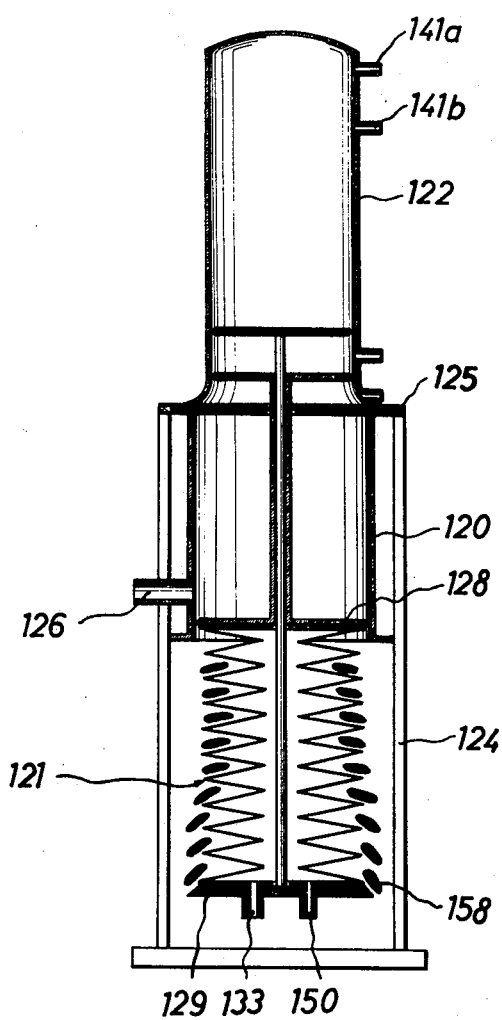
FIG. 9 is also a view similar to FIG. 7 but showing the accordion filter medium moved out of the filter drum for removal of the compacted filter cake.

In FIG. 9 the accordion filter medium 121 is shown driven out of the filter drum 120, with its filter screen 130 fully expanded. The valve 149 on the conduit 148 may now be opened to permit ingress of the air under pressure from the compressor 143 into the interior of the filter medium 121 via the air inlet opening 150. The air thus forced into the interior of the filter medium is doubly effective for removal of the consolidated masses 158 of the cake from the filter screen 130 and for removal of fine solid particles clogging the meshes of the filter screen. If desired, however, air under pressure may be blown over the filter medium 121 from a suitable external source of such compressed air to speed the removal of the cake masses from the filter screen.

Upon completion of the reconditioning of the accordion filter medium 121 the valves 145a, 145b and 149 should be all closed, and the valves 147b and 147a successively opened instead, to permit ingress of the air under pressure into the air cylinder 122 via the inlet-outlet openings 142b and 142a. The pistons 137a and 137b will then moved on their upward return stroke, until the end plates 128 and 129 of the accordion filter medium 121 return to their initial positions shown in FIG. 7. The retractable stops 178 may be pivoted back to retain the bottom end plate 129 of the filter medium at the open bottom end of the filter drum 120. With the air compressor 143 set out of operation the valve 127 may now be re-opened to initiate the next cycle of operation.

As will be apparent from the foregoing description of the filter apparatus of both horizontal and vertical types according to the invention, the apparatus is designed to repeat the cycle of filtration, compaction and dehydration of filter cake, removal of the compacted cake masses, and return of the accordion filter medium back to its working position. Alternatively, however, only the steps of filtration and filter cake compaction may be repeated several times, before proceeding to the succeeding step of cake removal. This alternative procedure may be preferable for some slurries or other fluids to be filtered. In either way the full automation of such cyclic operation will be an easy task for the specialists.

It is believed that the various objects of this invention, either explicitly stated or otherwise, have been fully accomplished in the filter apparatus of horizontal and vertical types shown and described hereinbefore. It is also understood, however, that the invention itself is not to be restricted by the exact showing of the drawings or the description thereof. For example, the accordion filter medium 21 of the horizontal filter apparatus can be incorporated in the vertical filter apparatus, and the accordion filter medium 121 in the horizontal filter apparatus. This and other substitutions, modifications or changes are intended in the foregoing disclosure. It is therefore appropriate that the invention be construed broadly and in a manner consistent with the fair meaning or proper scope of the following claims.

I claim:

1. A filter apparatus for removal of relatively fine solid particles from a fluid, comprising in combination:

a. a filter drum having a fluid inlet opening therethrough for the introduction of the fluid to be filtered, said filter drum having an open end and a closed end;

b. an accordion filter medium mounted within said filter drum, said accordion filter medium including:
1. first and second end plates slidably but fluid-tightly fitted in said filter drum for longitudinal movement therethrough, said first end plate being normally held at said open end of said filter drum and having a filtrate outlet opening therethrough;
2. a filter screen; and
3. means for supporting said filter screen in the form of a bellows between said first and second end plates;

whereby said filter screen is contractable and expansible as desired with the movement of said first and second end plates toward and away from each other;

c. a cylinder actuator connected to said closed end of said filter drum in coaxial relationship, said cylinder actuator including:
1. at least one piston; and
2. at least one piston rod connected at one end to said piston and at the other end to said first end plate of said accordion filter medium by slidably extending through said closed end of said filter drum and said second end plate;

whereby said cylinder actuator is capable of causing said first and second end plates to move toward each other for compaction of filter cake on said filter screen and of causing said accordion filter medium to move out of said open end of said filter drum for removal of the compacted filter cake, said filter screen being expanded upon movement of said accordion filter medium out of said open end; and d. means for removing the compacted filter cake from said filter screen upon movement of said accordion filter medium out of said open end of said filter drum.

2. The filter apparatus as recited in claim 1, wherein said filter screen is of a relatively thick fabric.

3. The filter apparatus as recited in claim 1, wherein said supporting means of said accordion filter medium includes a plurality of annular ribs of two different diameters alternately arranged in coaxial relationship between said first and second end plates.

4. The filter apparatus as recited in claim 1, wherein said removing means includes a source of air under pressure, and means for delivering the air under pressure from said source into the interior of said accordion filter medium.

5. The filter apparatus as recited in claim 4, wherein said cylinder actuator is an air cylinder adapted to be driven from said source of air under pressure.

6. The filter apparatus as recited in claim 1, further comprising means for facilitating the removal of the filter cake from said filter screen, said facilitating means including a vibrator rod adapted to impart vibrations to said accordion filter medium during its movement out of said open end of said filter drum.

7. The filter apparatus as recited in claim 1, further comprising means for arresting the travel of said second end plate at said open end of said filter drum upon movement of said accordion filter medium out of said open end.

8. The filter apparatus as recited in claim 1, wherein said supporting means of said accordion filter medium includes a series of pairs of perforated discs of resilient material and of dished configuration each having a central aperture and a plurality of notches extending radially from said central aperture, each pair being formed by coaxially combining two such discs with their convexities directed away from each other.

9. The filter apparatus as recited in claim 8, wherein the respective pairs of perforated discs are covered by separate pieces of the filter screen, each two adjacent pieces of the filter screen having their opposed edges tightly fitted between inner and outer rings which are received in said central aperture of one of each pair of perforated discs.

10. The filter apparatus as recited in claim 8, including netting arranged internally of said filter screen.

11. The filter apparatus as recited in claim 1, wherein said cylinder actuator further comprises a second piston, and a second piston rod connected at one end to said second piston and at the other end to said second end plate of said accordion filter medium by slidably extending through said closed end of said filter drum, the first recited piston rod of said cylinder actuator slidably extending through said second piston rod.

* * * * *